(12) United States Patent
Urrutia et al.

(10) Patent No.: US 11,031,903 B2
(45) Date of Patent: Jun. 8, 2021

(54) SOLAR ENERGY SYSTEM FOR USE WITH TUFTED GEOSYNTHETICS ON SLOPING GROUND

(71) Applicant: Watershed Solar LLC, Alpharetta, GA (US)

(72) Inventors: Jose L. Urrutia, Suwanee, GA (US); Michael R. Ayers, Johns Creek, GA (US); Michael Lucini, Somerville, MA (US); Gregory Lucini, Berkley, MA (US)

(73) Assignee: Watershed Solar, LLC, Alpharetta, GA (US)

( * ) Notice: Subject to any disclaimer, the term of this patent is extended or adjusted under 35 U.S.C. 154(b) by 0 days.

(21) Appl. No.: 15/808,526

(22) Filed: Nov. 9, 2017

(65) Prior Publication Data

US 2018/0131316 A1    May 10, 2018

Related U.S. Application Data

(60) Provisional application No. 62/419,764, filed on Nov. 9, 2016.

(51) Int. Cl.
*F24S 25/60* (2018.01)
*F24S 25/00* (2018.01)
(Continued)

(52) U.S. Cl.
CPC ............ *H02S 30/10* (2014.12); *E02D 17/202* (2013.01); *F24S 20/00* (2018.05); *F24S 25/00* (2018.05); *F24S 25/60* (2018.05); *H02S 20/10* (2014.12); *E02D 2300/0006* (2013.01); *F24S 2025/01* (2018.05); *Y10T 29/49355* (2015.01)

(58) Field of Classification Search
CPC ... Y10T 29/49355; H02S 30/10; H02S 20/10; E02D 17/202; F24S 20/00; F24S 2025/01; F24S 25/60; F24S 25/00
See application file for complete search history.

(56) References Cited

U.S. PATENT DOCUMENTS 8,403,597 B2    3/2013   Ayers
8,585,322 B2    11/2013  Ayers
(Continued)

FOREIGN PATENT DOCUMENTS

WO    WO-2011111286 A1 *  9/2011  ........ H01L 31/03926

OTHER PUBLICATIONS

Written Opinion of International Searching Authority, PCT/US2017/060883 (dated Jan. 17, 2018).

*Primary Examiner* — Jermie E Cozart
(74) *Attorney, Agent, or Firm* — Baker Donelson; Carl M. Davis, II (57) ABSTRACT

A solar energy system for use with tufted geosynthetics on sloping ground without the use of a traditional racking system. A frame attaches to the tufted geosynthetic cover to provide a flap and a solar panel secures to the flap directly or through a polymeric layer that attaches to the frame positioned between the flap and the tufted geosynthetic land cover with the solar panel adhesively attached to the polymeric layer. The solar panel being attached to the tufted geosynthetic land cover generates energy upon exposure to light. A method of securing a solar panel to a tufted geosynthetic land cover system for generation of energy is disclosed.

22 Claims, 5 Drawing Sheets

(51) Int. Cl.
*F24S 20/00* (2018.01)
*H02S 30/10* (2014.01)
*H02S 20/10* (2014.01)
*E02D 17/20* (2006.01)

(56) References Cited

U.S. PATENT DOCUMENTS

| | | |
|---|---|---|
| 2008/0069642 A1 | 3/2008 | Ayers |
| 2011/0197524 A1 | 8/2011 | Sahlin |
| 2011/0277296 A1 | 11/2011 | Ramos |
| 2011/0277806 A1 | 11/2011 | Gillenwater |
| 2013/0112247 A1* | 5/2013 | Li .......................... F24S 25/20 136/251 |
| 2014/0083028 A1 | 3/2014 | Richardson |

* cited by examiner

SOLAR ENERGY SYSTEM FOR USE WITH TUFTED GEOSYNTHETICS ON SLOPING GROUND

CROSS REFERENCE TO RELATED APPLICATIONS

The present application has benefit of U.S. patent application Ser. No. 62/419,764, filed Nov. 9, 2016.

STATEMENT REGARDING FEDERALLY SPONSORED RESEARCH OR DEVELOPMENT

Not applicable.

TECHNICAL FIELD

This invention relates to a solar energy system. In a more specific aspect, this invention relates to a solar energy system for use with tufted geosynthetics on sloping ground.

In this application, the following terms will be understood to have the indicated definitions.

"tufted geosynthetics"—a cover system which is generally comprised of synthetic grass having synthetic fibers tufted to a backing and a geomembrane and which is adapted to cover waste sites and other environmental closures. Examples of a tufted geosynthetic cover system are shown in Ayers and Urrutia U.S. Pat. Nos. 7,682,105 and 9,163,375. The term "tufted geosynthetics" is also used to refer to a synthetic turf cover system.

"waste sites"—refers to sites where waste is deposited, such as commercial and industrial landfills, phosphogypsum stacks, coal ash landfills, environmentally impacted land, leach pads, mining spoils and environmental closures or material stockpiles that require a closure system.

"synthetic grass"—refers to a composite which comprises at least one geotextile (woven or nonwoven) tufted with one or more synthetic yarns or strands and which has the appearance of grass.

"geomembrane"—refers to a textured polymeric material, such as high density polyethylene, very low density polyethylene, linear low density polyethylene, polyvinyl chloride, etc.

"sloping ground"—refers to ground which is not level, but has an angle of slope.

BACKGROUND OF THE INVENTION

Various types of solar panels have been used to receive, collect and transmit solar energy for conversion to electricity. Solar panels have been installed on ground, roofs and other locations for the best access to the sun and the available solar energy.

Additionally, various solar energy systems have been developed which include a racking or support structure for the solar panels, such as the racking structure disclosed in Ramos U.S. Pat. No. 8,984,751.

There is a need in the solar energy industry for a new and improved solar energy system which can be used with tufted geosynthetics on sloping ground without the use of a traditional racking structure. It is to such that the present invention is directed.

SUMMARY OF THE INVENTION

Briefly described, the present invention provides a new and improved solar energy system for use in conjunction with a landfill cover, such as a cover comprising tufted geosynthetics, for use on sloping ground without a traditional racking structure.

One advantage of the solar energy system of this invention is an increased production of energy for subsequent use by industry, the public, etc.

Closures of landfills, mines, coal ash and other waste piles may use a tufted geosynthetic (also referred to as synthetic turf) as part of the closure cover layer replacing natural vegetation. In particular, these closure covers use synthetic turf to replace soil covers that can be heavily eroded during storm events.

Traditional solar panel systems have often required subterranean anchors. However, with a synthetic turf closure system, there frequently is no soil layer, so anchors cannot be used without penetrating the cover system. Penetrations of cover systems are not an environmentally sound practice due to the leakage of rainwater into the waste mass that is being protected by the cover system.

The present invention meets the need in the art by providing a method of securing to a tufted geosynthetic land cover system a solar panel for generation of energy, comprising the steps of:

(a) attaching on a tufted geosynthetic land cover a portion of a frame to have a free flap extending from the attached portion; and (b) securing a solar panel to the flap comprising securing edge portions of a polymeric layer between the flap and the tufted geosynthetic land cover and attaching the solar panel to the polymeric layer.

In an alternate embodiment, the method secures the solar panel to the flap through a polymeric layer.

In another aspect, the present invention meets the need in the art by providing a solar panel energy system for installation to a tufted geosynthetic land cover overlying a ground surface. The solar panel energy system comprises a frame for attaching on a tufted geosynthetic land cover overlying a ground surface to provide a lateral portion as a flap extending to a distal edge and a solar panel for securing to the flap, with a polymeric layer for securing a respective edge portion thereof between a respective portion of the flap and the tufted geosynthetic land cover, the solar panel attached to the polymeric layer for securing to the flap, whereby the solar panel being secured in overlying relation to the tufted geosynthetic land cover generates energy upon exposure to light.

An alternate embodiment provides a polymeric layer for positioning a respective edge portion thereof between a respective portion of the flaps and the tufted geosynthetic land cover, which polymeric layer mechanically attaches to the flaps, and the solar panel secures to the flap through the polymeric layer by an adhesive coating that attaches the solar panel on a portion of a major planar surface of the polymeric layer.

Objects, advantages and features of the present invention will become apparent from a reading of the following detailed description of the invention and claims in view of the appended drawings.

DETAILED DESCRIPTION OF THE INVENTION

The present invention provides a solar energy system for use preferably in conjunction with a landfill cover on sloping ground without a traditional racking structure, although this solar energy system can be used in other locations (such as non-landfill sites) and with a racking system.

The principal components of this invention are a landfill cover, one or more smaller sections of tufted geosynthetics (i.e., synthetic turf), a polymeric layer and at least one solar energy panel.

Landfill Cover

Examples of landfill covers useful in the solar energy system of this invention are the covers marketed by Watershed Geosynthetics LLC under the registered trademarks ClosureTurf and VersaCap. These covers comprise a composite of at least one geotextile which is tufted with one or more synthetic yarns (i.e., a tufted geosynthetic) and an impermeable geomembrane which is comprised of a polymeric material.

If desired, the synthetic grass of the landfill cover can contain an infill (such as sand) for extra ballast and/or a material for protection of the synthetic grass against ultraviolet rays.

In this invention, the landfill cover is located on top of the waste site or other environmental closure, with the synthetic grass positioned as the uppermost portion of the landfill cover and facing away from the landfill.

Additional Sections of Synthetic Turf

On top of the landfill cover is one or more additional sections of synthetic turf which may be identical in composition to the synthetic turf of the landfill cover, except these additional sections do not include a geomembrane.

Figure 3:
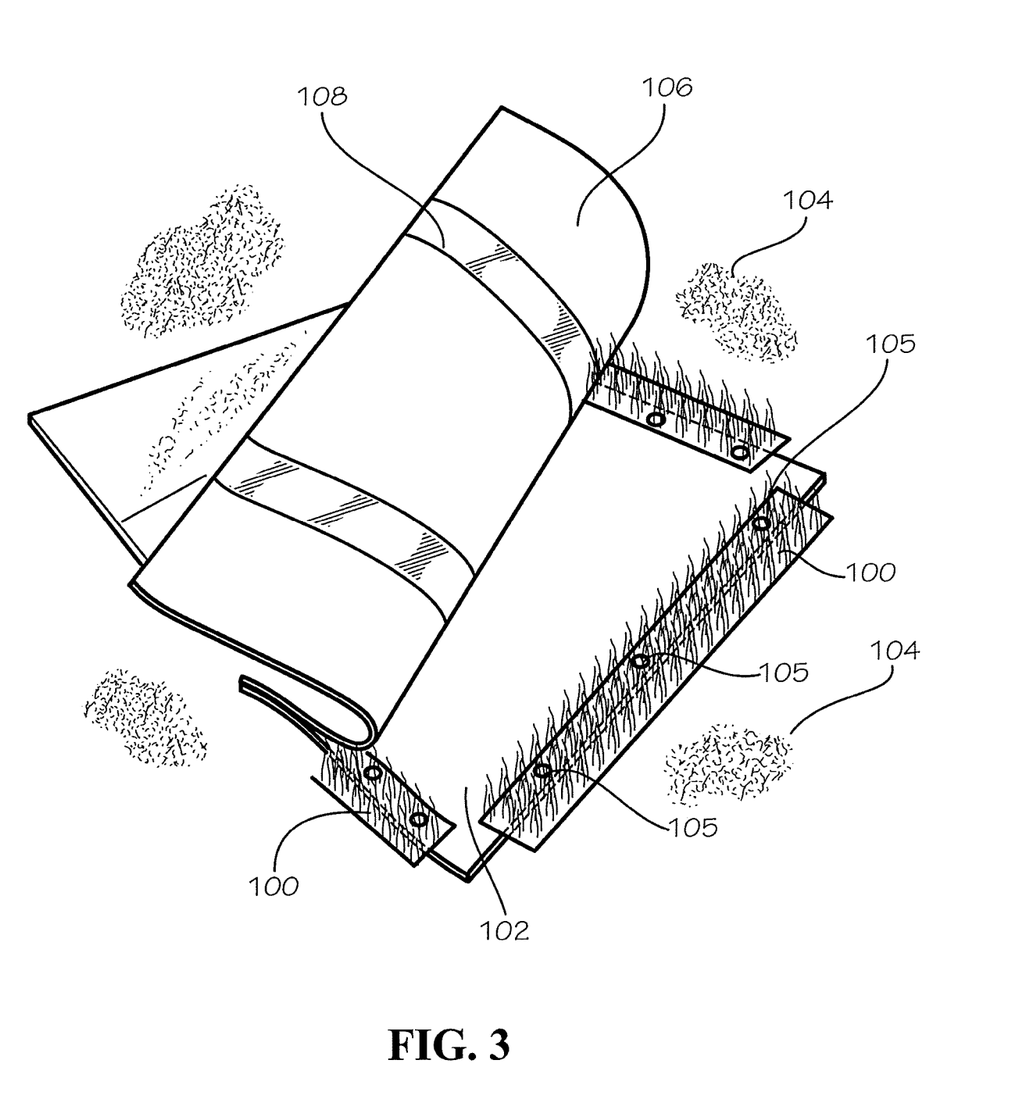
FIG. 3 is a view showing a synthetic turf located under and attached to a layer of a polymeric material which is located under and attached to a solar panel.

The additional sections are arranged in a fashion to surround the solar panel, but not be in contact with the solar panel, such as in a generally rectangular arrangement (i.e., as in a picture frame). For example, the section(s) can be a continuous strip (FIG. 1) or one or more separate flaps (FIG. 3).

The section(s) are bonded to the synthetic grass of the landfill cover.

The tufts of the synthetic grass (i.e., on the underside) are bonded to the synthetic grass of the landfill cover, such as by mechanical means, chemical means, thermal bonding, an adhesive, etc. An example of bonding is by welding with heat and pressure.

A preferred bonding method is to join strips of synthetic turf to one another, with a synthetic turf being of the type having synthetic tufts. This method includes the steps of: (a) laying down a first strip of synthetic turf having synthetic tufts; (b) laying down a second strip of synthetic turf so that a portion of the second strip of synthetic turf overlaps the first strip of synthetic turf; and (c) applying heat and pressure to the strips of synthetic turf at the point of overlap to bond the first strip to the second strip.

Polymeric Layer

A layer of polymeric material is used in the solar energy system of this invention to bond to the additional sections of synthetic turf and to provide a surface for attaching the solar panel(s). Examples of suitable polymeric materials for this layer are polyethylene, low density polyethylene, high density polyethylene, polypropylene, polyurethane, ethylene propylene diene monomer, thermoplastic polyolefins, and poly vinylchloride. Preferred polymeric materials are thermoplastic polyolefins and ethylene propylene diene monomer.

Various means can be used to bond this layer to the additional smaller sections of synthetic turf. Examples of such means are mechanical and chemical means, such as rivets, bolts, thermal bonding, etc. A preferred method of bonding is by rivets or bolts.

Solar Panel

One or more solar panels can be used in this solar energy system such as commercially available rigid and flexible thin film solar panels.

An example of a flexible thin film solar panel is the panel available from MiaSole Hi-Tech Corp. (Santa Clara, Calif.) under the trademark FLEX-02N.

Figure 1:
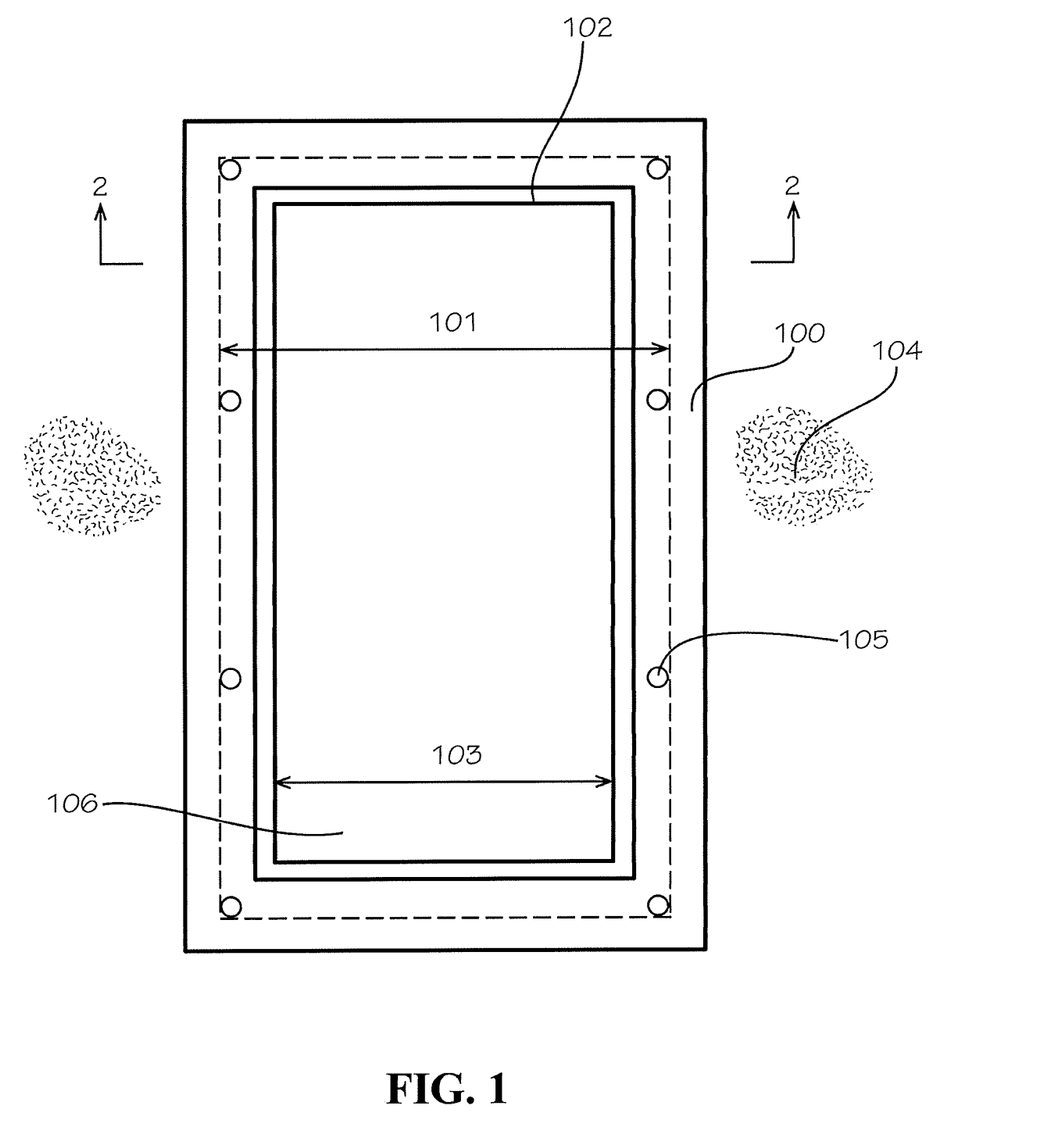
FIG. 1 is a schematic view of a preferred embodiment of the solar energy system of this invention.

Referring now to the drawings, in which like numerals represent like elements, FIG. 1 shows a preferred embodiment of this invention with a landfill cover 104 having synthetic grass and located on top of the waste site (not shown).

Around and on top of the landfill cover 104 is positioned a smaller section 100 of synthetic turf (i.e., strip or flap) which is identical in composition to the cover 104, except for the impermeable geomembrane, and which is welded to the synthetic grass of the cover 104 with heat and pressure (not shown). As best illustrated in cross-sectional view in FIG. 2 taken along line 2-2 of FIG. 1, the smaller section 100 is welded along an outward perimeter portion 107 and with a lateral portion 109 extending therefrom to a respective inward free distal edge to define a flap.

Figure 2:
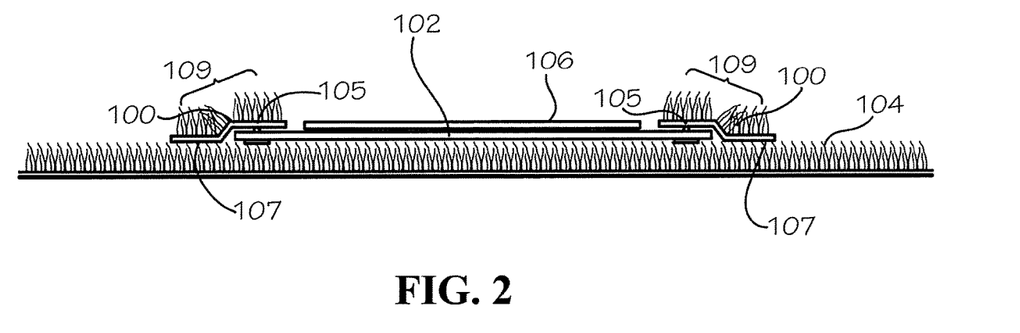
FIG. 2 is a cross-section of the embodiment shown in FIG. 1 taken along line 2-2 and shows the synthetic turf, a thermoplastic polyolefin layer and a solar panel.

With continuing reference to both FIGS. 1 and 2, a polymeric layer 102 having the dimension 101 is positioned between the cover 104 and the smaller section 100. The polymeric layer 102 attaches to the smaller section 100 by one or more fasteners, such as rivets 105. The flap overlies an edge perimeter portion of the polymeric layer. The fasteners extend through the flap and the polymeric layer to secure the flap and polymeric layer together. Alternatively, other embodiments attach the flap and polymeric layer together by other mechanical fasteners (threaded bolts and nuts, for example), chemical adhesive bonding, or heat bond.

Figure 2A:
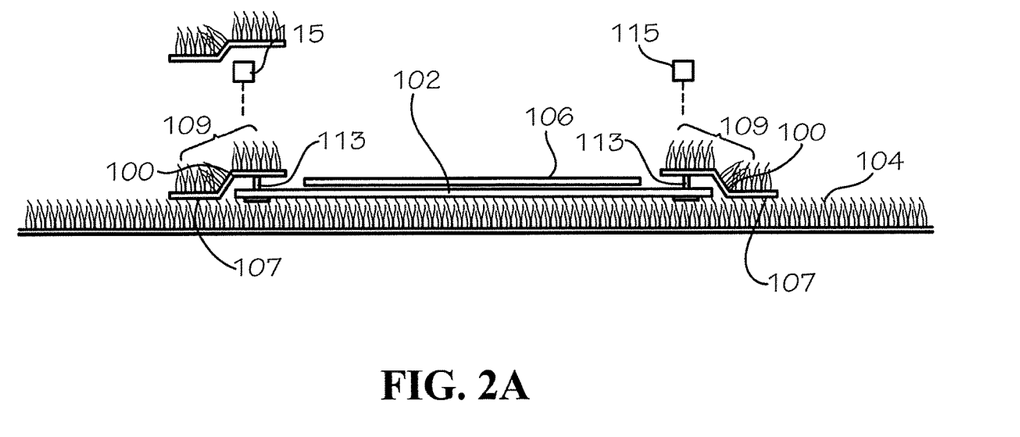
FIG. 2A is a cross-section of an alternate embodiment of the solar energy system of this invention.

FIG. 2A illustrates an alternate embodiment in which the polymeric layer secures to the section 100 with a plurality of threaded bolts 113 and nuts 115. The polymeric layer 102 is depicted slightly exploded from the flap of the section 100 for illustration purposes. In yet another alternate embodiment illustrated in FIG. 2B, the polymeric layer secures to the section 100 with a bond 117 (slightly exaggerated in thickness for illustration purposes) that in one embodiment is an adhesive and in another embodiment is a heat bond or heat/compression bond of the flap and polymeric layer.

With continuing reference to FIGS. 1 and 2, located above but attached to the polymeric layer 102 is a solar panel 106. The solar panel 106 has a dimension 103. The dimension 103 is less than then dimension 101 of the polymeric layer, so the solar panel 106 seats spaced from an inward edge of the section 100. The dimension 101 is less than the dimension between opposing outward edges of the section 100.

FIG. 2 shows a cross-section of the embodiment of FIG. 1, in which a solar panel 106 is placed over and in contact with the polymeric layer 102 and attached by fastener means 105 such as rivets or bolts or other attachment mechanism such adhesive bonding.

FIG. 3 shows a partial tear-away view of the embodiment of FIG. 1, with the cover 104, the smaller section 100, the polymeric layer 102, the solar panel 106 and adhesive means 108 for attaching solar panel 106 to polymeric layer 102. In the illustrated embodiment, a major planar surface of the solar panel 106 includes an adhesive coating disposed in spaced-apart elongated strips.

Figure 4:
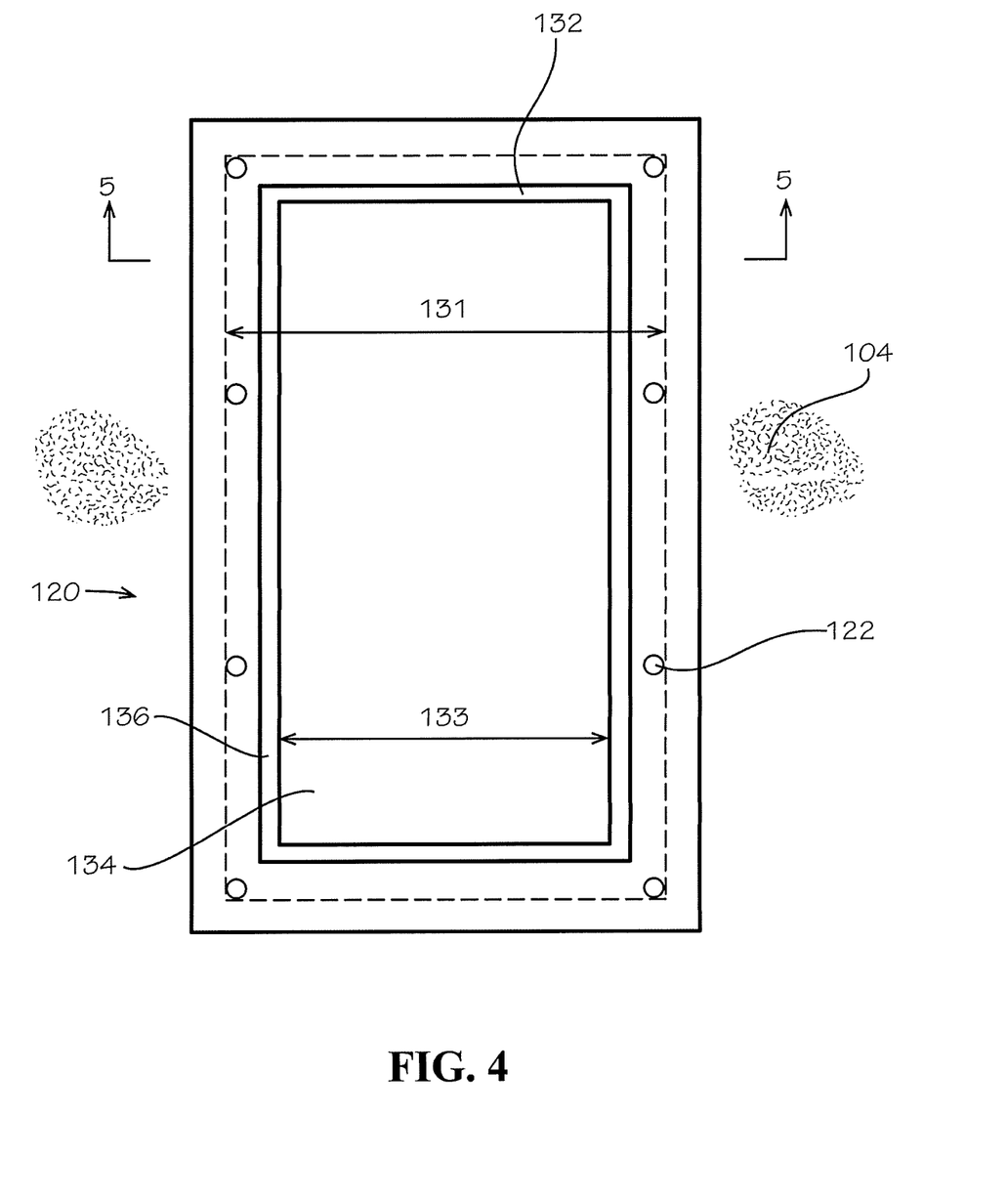
FIG. 4 is a schematic view of an alternate embodiment of the solar energy system of this invention.

FIG. 4 is a schematic view of an alternate embodiment 120 of the solar energy system of this invention with the landfill cover 104 having synthetic grass and located on top of a ground area such as a waste site (not shown). A smaller section 122 of synthetic turf (i.e., strip or flap) positions on top of the landfill cover 104. The section 122 is identical in composition to the cover 104, except for the impermeable geomembrane. As best illustrated in cross-sectional view in FIG. 5 taken along line 5-5 of FIG. 4, the section 122 welds along an exterior edge 124 to the synthetic grass of the cover 104 with heat and pressure (not shown). A lateral portion 130 extends therefrom to a respective inward free distal edge to define a flap.

Figure 5:
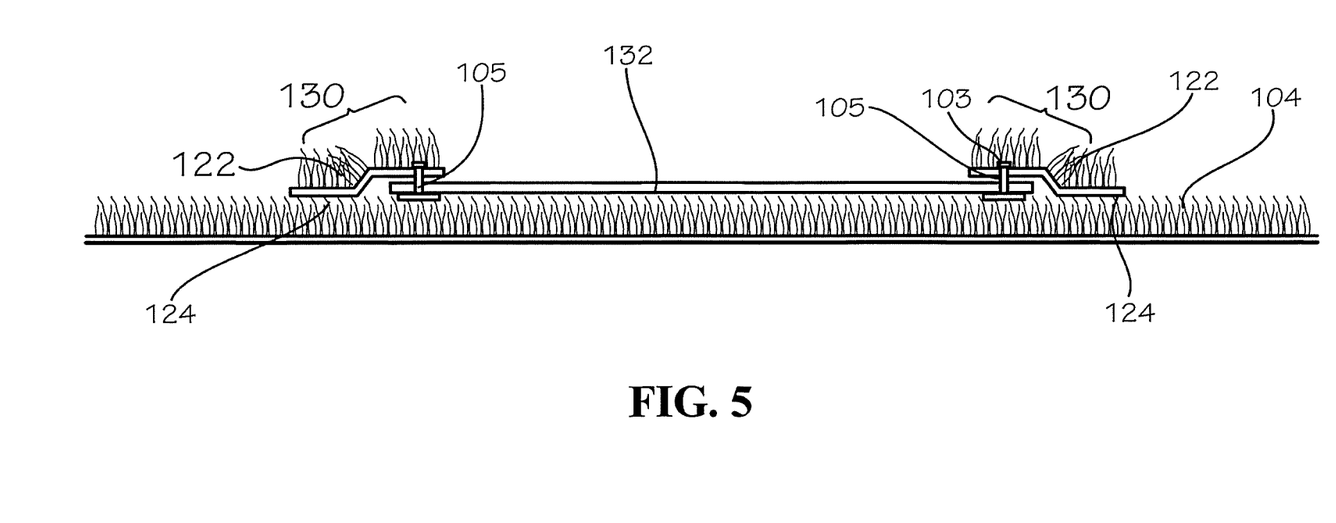
FIG. 5 is a cross-section of the embodiment shown in FIG. 4 taken along line 5-5 and shows the synthetic turf and a solar panel.

With continuing reference to both FIGS. 4 and 5, a solar panel 132 having the dimension 131 positions between the cover 104 and the smaller section 122. The solar panel 132 has an active solar energy portion 134 and a perimeter edge portion 136. The active portion 132 has a dimension 133. The perimeter portion 136 is at least partially overlaid by the flap or lateral portion 130. The solar panel 132 attaches to the smaller section 120 by one or more fasteners, such as rivets 135 or alternatively, by threaded bolts and nuts, or adhesively. The fasteners extend through the flap and the perimeter portion to secure the flap and solar panel together. Similarly, adhesive may connect the flap and the solar panel. The perimeter portion 136 may be reinforced with a tape or material overlay (not illustrated) for receiving the fasteners therethrough while resisting tear-through which may be created by wind loading on the solar panel.

The dimension 133 is less than the dimension 131 of the solar panel, so the active portion 134 of the solar panel 132 seats spaced from an inward edge of the section 122. The dimension 131 is less than the dimension between opposing outward edges of the section 122.

Figure 2B:
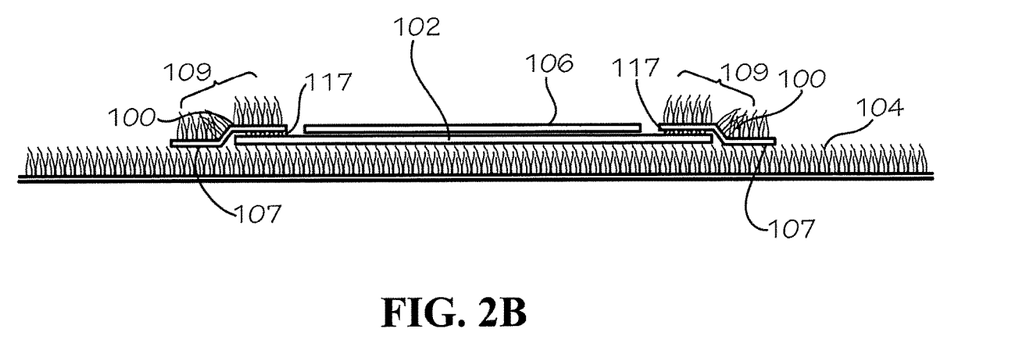
FIG. 2B is a cross-section of an alternate embodiment of the solar energy system of this invention.

FIG. 5 shows a cross-section of the embodiment of FIG. 4, in which the solar panel 132 is placed over the cover 104 and under the flap portion of the frame 122. The flap and the solar panel attach together by fastener means such as rivets, bolts and nuts, or adhesive bonding, similarly as illustrated in FIGS. 2, 2A and 2B relative to the polymeric layer and frame attachment.

The system of this invention allows the use of solar panels on steep slopes where a racking structure may not effectively work.

This system also provides resistance to wind, such as uplifts, distortion, turbulence, etc.

The solar energy system of this invention can be used on steep slopes that use tufted geosynthetic technology as part of the environmental closure. Further this invention allows solar panels to be integrated into the tufted geosynthetic layer without penetrating the cover system, while securing the panels in a manner that resists sliding.

This solar energy system overcomes the inability to attach non-polyethylene membranes to the polyethylene synthetic turf, as well as provides enough strength to overcome sliding forces that result from the low coefficient of friction of the panel when interfacing with the landfill's tufted geosynthetic closure layer. This system recognizes that one of the major issues with polyethylene geomembranes and tufted geosynthetics is that nothing adheres to the polyethylene material in a sufficient manner to allow for a reliable bond, but solves this issue by incorporating one or more tufted geosynthetic strips that frame the solar panel. These strips can be heat bonded to the turf because the strip has polymer properties similar to the underlying tufted geosynthetic. The bond created has sufficient strength to hold the solar energy system from sliding or tilting down the slope.

The tuft strip of this invention allows a simple connection to the cover system by heating and compression of the polyethylene material to the frame structure to the point that provides resistance against sliding of the solar energy system on steep slopes. The frame and strip provide forces of shear stress ranging from 40 to 100 pounds per inch on the strip surrounding the solar energy system.

This invention has been described with particular reference to certain embodiments, but variations and modifications can be made without departing from the spirit and scope of the invention.

What is claimed is:

1. A method of securing to a tufted geosynthetic land cover system a solar panel for generation of energy, comprising the steps of:
    (a) attaching on a tufted geosynthetic land cover a portion of a frame to have a free flap extending from the attached portion; and
    (b) securing a solar panel to the flap comprising securing edge portions of a polymeric layer between the flap and the tufted geosynthetic land cover and attaching the solar panel to the polymeric layer.

2. The method as recited in claim 1, further comprising the step of providing a plurality of elongated members to define the frame.

3. The method as recited in claim 2, wherein the elongated members comprise tufted geosynthetic strips.

4. The method as recited in claim 1, wherein the frame has a polymeric affinity for a polymer property of the tufted geosynthetic land cover, whereby step (a) comprises heat bonding the portion of the frame to the tufted geosynthetic land cover.

5. The method as recited in claim 4, wherein the frame comprises polyethylene.

6. The method as recited in claim 1, further comprising the step of providing an adhesive between the solar panel and the polymeric layer for securing the solar panel to the polymeric layer.

7. The method as recited in claim 1, wherein securing edge portions comprises attaching the polymeric layer mechanically to the flap.

8. The method as recited in claim 7, wherein the mechanical attaching of the polymeric layer to the elongated flaps comprises the step of passing a plurality of fasteners therethrough.

9. The method as recited in claim 7, wherein mechanical attaching of the polymeric layer to the flaps comprises riveting with rivets.

10. The method as recited in claim 7, wherein the mechanical attaching of the polymeric layer to the flap comprises extending a plurality of threaded bolts though the polymeric layer and the flaps and securing each bolt with a respective one of a plurality of nuts.

11. The method as recited in claim 7, wherein mechanical attaching comprises adhering the polymeric layer to the flap with an adhesive.

12. A solar panel energy system for installation to a tufted geosynthetic land cover overlying a ground surface, comprising:
 a frame for attaching on a tufted geosynthetic land cover overlying a ground surface to provide a lateral portion as a flap extending to a distal edge;
 a solar panel for securing to the flap;
 a polymeric layer for securing a respective edge portion thereof between a respective portion of the flap and the tufted geosynthetic land cover, the solar panel attached to the polymeric layer for securing to the flap,
 whereby the solar panel being secured in overlying relation to the tufted geosynthetic land cover generates energy upon exposure to light.

13. The solar panel energy system as recited in claim 12, wherein the frame comprises a plurality of elongated members.

14. The solar panel energy system as recited in claim 13, wherein the elongated members are tufted geosynthetic strips.

15. The solar panel energy system as recited in claim 12, wherein the frame has a polymeric affinity for bonding with the tufted geosynthetic land cover.

16. The solar panel energy system as recited in claim 15, wherein the frame comprises polyethylene and heat bonds in attachment with the tufted geosynthetic land cover.

17. The solar panel energy system as recited in claim 12, wherein the solar panel comprises a perimeter portion for receiving fasteners to secure the solar panel to the frame.

18. The solar panel energy system as recited in claim 12, further comprising an adhesive between the solar panel and the polymeric layer, whereby the solar panel attaches to the polymeric layer.

19. The solar panel energy system as recited in claim 12, further comprising a plurality of fasteners for securing edge portions of the polymeric layer to the flap.

20. The solar panel energy system as recited in claim 19, wherein the fasteners comprise rivets.

21. The solar panel energy system as recited in claim 19, wherein the fasteners comprise a plurality of threaded bolts and nuts, each of the threaded bolts extending through the polymeric layer and the flaps and secured with one of the nuts.

22. The solar panel energy system as recited in claim 12, wherein the solar panel has an perimeter boundary for securing to the polymeric layer.

* * * * *